(12) United States Patent
Becker

(10) Patent No.: US 8,092,151 B2
(45) Date of Patent: Jan. 10, 2012

(54) WIND TURBINE WITH LIQUID MEDIUM DISTRIBUTION SYSTEM

(75) Inventor: Christian Becker, Aachen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/037,418

(22) Filed: Mar. 1, 2011

(65) Prior Publication Data

US 2011/0217169 A1 Sep. 8, 2011

(30) Foreign Application Priority Data

Mar. 5, 2010 (EP) .................................... 10155655

(51) Int. Cl.
*F03D 11/00* (2006.01)

(52) U.S. Cl. .......................... 415/112; 415/4.3; 415/175
(58) Field of Classification Search .................... 415/4.3, 415/4.5, 110, 111, 112, 113, 116, 117, 175
See application file for complete search history.

(56) References Cited

U.S. PATENT DOCUMENTS

| | | | | |
|---|---|---|---|---|
| 4,368,692 A | * | 1/1983 | Kita | 122/26 |
| 4,503,673 A | * | 3/1985 | Schachle et al. | 60/398 |
| 5,088,890 A | * | 2/1992 | Jewess | 415/112 |
| 6,520,737 B1 | | 2/2003 | Fischer et al. | |
| 7,168,251 B1 | | 1/2007 | Janssen | |
| 7,802,961 B2 | * | 9/2010 | Grabau | 415/4.3 |

FOREIGN PATENT DOCUMENTS

WO WO 0177526 A1 10/2001
WO WO 2008052557 A2 5/2008

* cited by examiner

*Primary Examiner* — Nathaniel Wiehe

(57) ABSTRACT

A wind turbine with a tower, a nacelle, a main shaft, a hub and blades is provided. The wind turbine also includes a liquid medium distribution system for transport of liquid medium in the wind turbine. The liquid medium distribution system has a first distribution sub-system located in the tower, a second distribution sub-system located in the nacelle, a third distribution sub-system located in the hub, a tower-nacelle-interface connecting the first distribution sub-system to the second distribution sub-system, and a nacelle-hub-interface connecting the second distribution sub-system to the third distribution sub-system. Further, a method of transporting liquid medium in a wind turbine is provided.

13 Claims, 2 Drawing Sheets

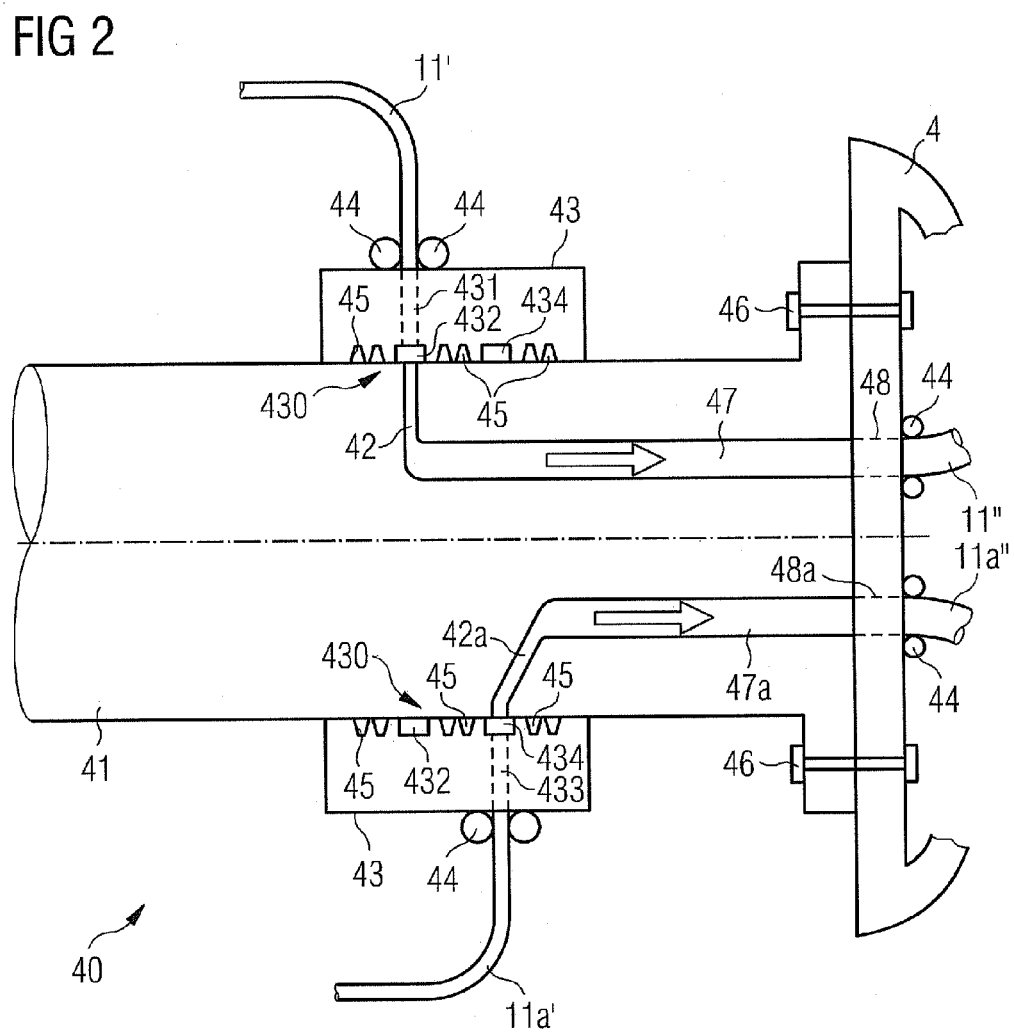

WIND TURBINE WITH LIQUID MEDIUM DISTRIBUTION SYSTEM

CROSS REFERENCE TO RELATED APPLICATIONS

This application claims priority of European Patent Office Application No. 10155655.3 EP filed Mar. 5, 2010, which is incorporated by reference herein in its entirety.

FIELD OF INVENTION

The invention describes a wind turbine comprising a tower, a nacelle, a main shaft, a hub with blades, and a liquid medium distribution system for transport of liquid medium in the wind turbine. The invention further describes a method of transporting liquid medium in a wind turbine and a use of a liquid medium distribution system in a wind turbine.

BACKGROUND OF INVENTION

Liquid media may be transported in a wind turbine for a number of reasons. For example, a liquid medium may be part of a heating-system for the wind turbine or for other parts of the wind turbine.

U.S. Pat. No. 7,168,251 discloses a wind energy turbine with a unit to be cooled by a cooling medium (gas or liquid) flowing in a cooling circuit from said unit to a heat exchanger. The unit to be cooled is arranged in the tower or in the nacelle of the wind energy turbine. The heat exchanger is located outside of the tower or the nacelle and is configured to be cooled by ambient air. In one embodiment, the cooling components are used in a closed-loop cooling circuit with a liquid cooling medium, for example water. A pump or similar element is also arranged in the cooling circuit.

U.S. Pat. No. 6,520,737 discloses an offshore wind turbine, wherein a power transmission in a nacelle is cooled by means of a liquid conducted to the nacelle from a tower on which the nacelle is pivotally arranged around a vertical yawing axis. A device is shown for forming one or more passageways for liquid between the nacelle and the tower during most yaw positions of the nacelle.

Regarding other liquids, in particular any liquid medium required in the hub, for example lubricating oil for use in bearings or hydraulic systems, liquids for blade defrosting etc., in the prior art such liquid media are only transported intermittently in batches. A liquid medium is first stored in a transport vessel or container, lifted into the nacelle by cranes or hoists and manually distributed there by maintenance staff. Obviously, such a manual distribution of the liquid media is time-consuming and expensive.

SUMMARY OF INVENTION

It is an object of the invention to provide a wind turbine with an improved system for transport of liquid media and accordingly to provide an improved method of transporting liquid media in a wind turbine.

The object of the invention is achieved by a wind turbine, by a method of transporting liquid medium in a wind turbine and by a use of a liquid medium distribution system according to the independent claims.

A wind turbine according to the invention comprises a liquid medium distribution system with
 a first distribution sub-system located in the tower;
 a second distribution sub-system located in the nacelle;
 a third distribution sub-system located in the hub;
 a tower-nacelle-interface connecting the first distribution sub-system to the second distribution sub-system, and
 a nacelle-hub-interface connecting the second distribution sub-system to the third distribution sub-system.

The favourable arrangement of the liquid medium distribution system allows a transport of a liquid medium to desired locations which may be located anywhere in the wind turbine. The arrangement of the first, second and third distribution sub-systems, together with the tower-nacelle-interface and the nacelle-hub-interface, allow an effective distribution of the liquid media, meeting also requirements of a distribution via the two main rotating interfaces (tower-nacelle and nacelle-hub) in a wind turbine to the hub. Compared with prior art solutions, liquid media can be continually supplied to any part of the wind turbine, instead of only intermittently. The liquid medium is provided in a comfortable manner where, when and how it is needed. As a favourable consequence, periods of idleness of the wind turbine in order to perform regular maintenance works can be minimized. Maintenance tasks are simplified and speeded up. Therefore, by means of the liquid medium distribution system, a continuous flow of liquid medium is possible, which advantageously allows—despite a drastically reduced rate of maintenance with regard to common wind turbines—a continuous and substantially failure-free operation of the wind turbine according to the invention. In other words, a profitability of a wind turbine with the liquid distribution system according to the invention can advantageously be enhanced to a considerable extent.

Hereinafter, for the sake of clarity, the expression "connecting" with regard to the liquid distribution system means a functional coupling of diverse items, which coupling enables a flow of liquid medium within the wind turbine.

Particularly advantageous embodiments and features of the invention are defined in dependent claims, as revealed hereinafter. Features of the various embodiments described may be combined as appropriate.

A preferred embodiment of the wind turbine according to the invention is characterized in that the first, the second and the third distribution sub-systems each comprise a pipe and optionally at least one of the following items: a pump, a reservoir, a valve for regulating flow of the liquid medium, a heat exchanger for heating and/or cooling the liquid medium. These allow numerous ways in which the liquid medium can be transported, stored, accessed and regulated in its flow throughout the whole wind turbine or through parts of it. The items mentioned can selectively be arranged at desired locations in the tower, and/or in the nacelle, and/or in the hub. Thus, an individual adaptation of the liquid medium distribution system to real requirements of the liquid media in the wind turbine is possible.

The tower-nacelle-interface may be realized similar to the cooling fluid system in the U.S. Pat. No. 6,520,737. However, to allow a yawing of the nacelle relative to the tower, the electric connections from components in the nacelle to the tower is often realized via cables having a suitable length such that the nacelle may rotate, driven by motor or by the incoming wind, several times around the yawing axis. In an initial position of the nacelle the cables exhibit a sag and the cable twists further with each turn of the nacelle until the cable is too short to allow a further turn. Then, the nacelle is returned to the initial position using a motor driven by an appropriate controlling unit. In a cost-effective, and therefore preferred, embodiment of the invention the tower-nacelle-interface of the liquid medium distribution system of the wind turbine comprises a flexible hose with a sag, wherein an amount of the sag is dimensioned in accordance to a length of at least an electric cable running from the tower into the nacelle. In this way, the twisting and untwisting of the flexible hose can advantageously be synchronized with a twisting and untwisting of the electric cable.

The nacelle-hub-interface advantageously comprises at least a channel in the main shaft extending essentially along the main shaft and a first sub-interface connecting the second distribution sub-system to the channel. Thus, a continuous flow of the liquid medium into the main shaft is supported. By means of the channel in the main shaft, the liquid medium can be transported further through the wind turbine towards the hub.

In a further preferred embodiment, the first sub-interface comprises at least a first duct extending radially from an outer wall of the main shaft to the channel and a housing which encloses the main shaft annularly at an emersion position of the first duct at which the first duct intersects the outer wall of the main shaft. The housing is sealed against the main shaft and comprises a channel system through which the liquid medium from the pipe of the second distribution subsystem into the first duct during operation of the liquid distribution system. For example, the channel system in the housing may comprise an annular groove in the inner wall of the housing at the emersion position of the duct in the main shaft and a bore running radially from the grove to a junction at which a pipe of the second distribution sub-system may be connected. Alternatively or additionally the shaft may also comprise an annular groove on its outer side at the emersion position of the duct in the main shaft. Sealings between the housing and the main shaft may be on either side of the groove along an axial direction of the main shaft. Thus, an effective and safe transfer of the liquid medium from the pipe of the second distribution sub-system into the channel is enabled. Preferably, the housing of the first sub-interface is sealed to the rotating main shaft by means of a number of labyrinth seals. Using this reliable kind of conventional sealing, any loss or spilling of liquid medium at an intersection between the non-rotating housing and the rotating main shaft is minimized to an extent as much as possible. In a preferred embodiment, the main shaft is hollow alongside its longitudinal axis and the channel in the main shaft is a pipe or a tube. In this way, a comfortable guidance element in the form of a tube or a pipe for the liquid medium can be realized inside the main shaft and can easily be replaced or renewed. Also, by preventing a physical contact between the main shaft and the liquid medium, a possible harmful (e.g. chemical) contact between the liquid medium and a material of the main shaft can be avoided in this manner.

The first sub-interface advantageously comprises several first ducts as well as several channels. Accordingly, the housing may comprise also several bores and the housing and/or the main shaft may comprise several grooves at the emersion positions of the duct, each sealed against each other. In this way, different types of liquid media with different properties can be transported into the main shaft and onwards to the hub. Consequently, a further diversification of the liquid medium distribution system is facilitated. Also, an enhanced volumetric flow rate of the liquid medium through the main shaft is made possible in this manner.

The channels in the main shaft, in particular when they are realized in form of pipes or tubes, may be extended into the hub to build at least part of the third distribution sub-system in the hub. However, the nacelle-hub-interface may further comprise a second sub-interface connecting the channel in the main shaft to the third distribution sub-system via appropriate junctions.

Preferably, the second sub-interface comprises at least a second duct arranged in the hub, wherein the second duct is connected to the channel in the main shaft. A straightforward extension for the liquid medium from the channel in the main shaft into the hub is provided in this way. The second duct can be dimensioned separately in a quantitative and qualitative respect, for example as regards a number of second ducts or a physical diameter of the second duct, which should correspond to a physical diameter of the channel in the main shaft. A preferred essentially coaxial orientation of the second duct with respect to the channel in the main shaft allows an easy manufacture of the second duct, e.g. in a standardized milling process.

A further preferred embodiment of the wind turbine according to the invention is characterized in that a hub-blade-interface is provided in the hub, which hub-blade-interface connects the third distribution sub-system to a fourth distribution subsystem being located in at least one of the blades. In this manner, a further extension of the flow of the liquid medium is enabled into at least one of the blades, for example to provide a defrosting system in the blades with a defrosting liquid. Needless to say, depending on specific requirements, the fourth distribution sub-system can be arranged in alone or more of the blades of the wind turbine. The fourth distribution sub-system comprises a pipe and optionally at least one of the following items: a pump, a reservoir, a valve for accessing the liquid medium, an exit opening for the liquid medium. Thus, as already described for the first, the second and the third distribution sub-system, a useful diversified design of the fourth distribution sub-system is facilitated.

Other objects and features of the invention will become apparent from the following detailed description considered in conjunction with the accompanying drawings. It is to be understood, however, that the drawings are designed solely for the purposes of illustration and not as a definition of limitations of the invention.

BRIEF DESCRIPTION OF THE DRAWINGS

FIG. 2 shows in greater detail a schematic representation of a nacelle-hub-interface in a wind turbine according to FIG. 1.

In the drawings, like reference numbers refer to like objects throughout. Objects in the drawings are not necessarily drawn to scale.

DETAILED DESCRIPTION OF INVENTION

Figure 1:
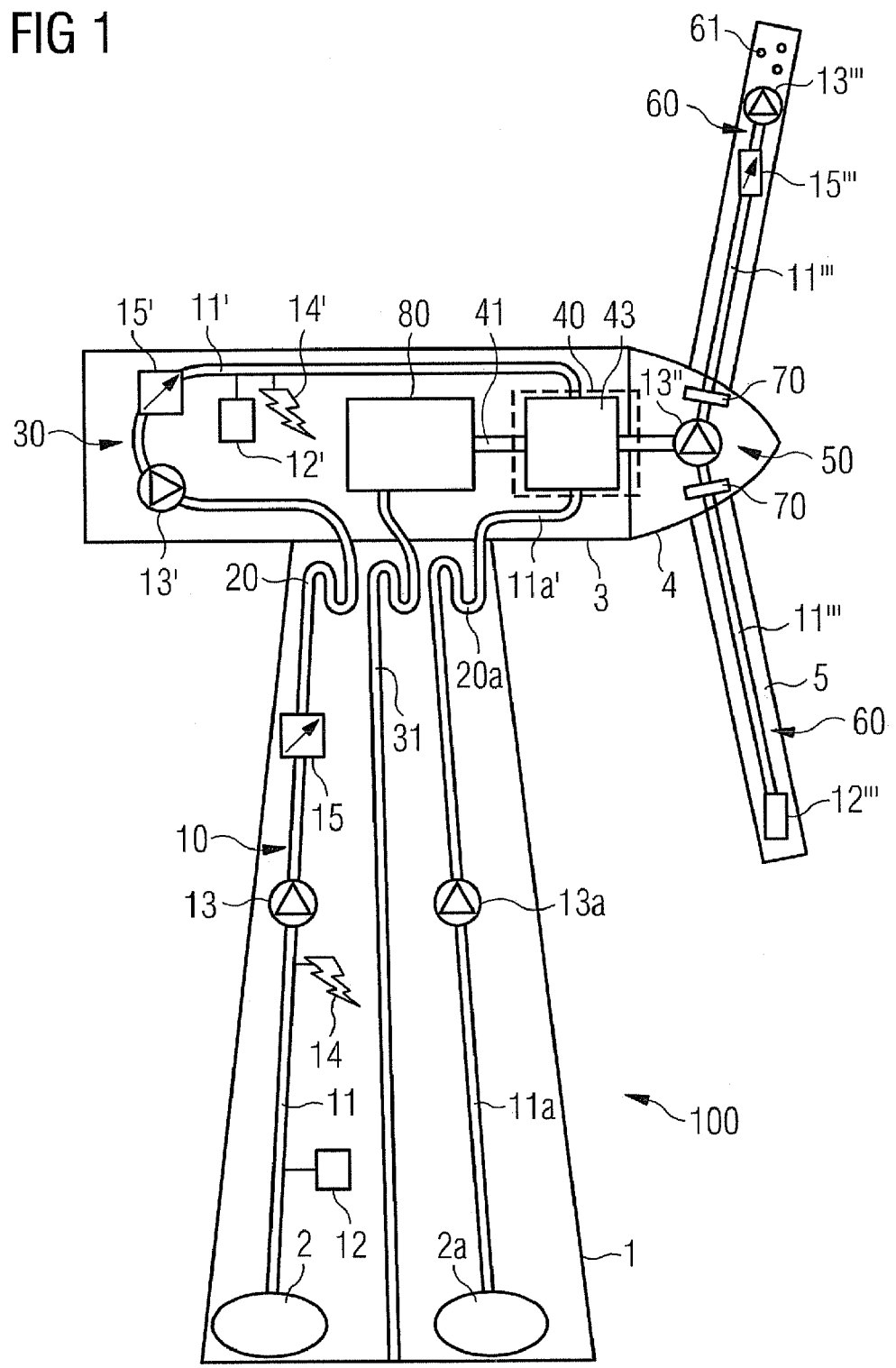
FIG. 1 shows a schematic representation of an embodiment of a wind turbine according to the invention.

FIG. 1 shows an embodiment of a wind turbine according to the present invention. The wind turbine 100 comprises a tower 1, a nacelle 3 being rotatable supported by the tower 1, and a hub 4 being rotatable supported by the nacelle 3. Blades 5 are arranged on and fixed to the hub 4. The mentioned elements are conventional elements of a wind turbine 100 and will as such thus not be illustrated in more detail hereinafter. Furthermore, a normal operation of the wind turbine 100 is not in the focus of the invention and will thus also not be described in detail hereinafter. Only those items, elements and systems that are relevant to the invention will be elucidated in the following description.

Inside or outside (not shown) of the tower 1 is a source 2, 2a of liquid. Though explicitly two sources 2, 2a are shown in FIG. 1, it is possible that only one or more than two sources 2, 2a are arranged in the context of the invention. The term "source" is used generically in the context of this application, i.e. a point from which liquid is fed into the liquid distribution system of the wind turbine 100. The term "liquid medium" in the context of the application is preferably any liquid medium which, for example, can be used for lubricating and/or heating and/or defrosting any parts of the wind turbine 100. As an option, the liquid medium could also be used for cooling purposes. As a further option, the liquid medium could also be a hydraulic fluid used for a mechanical adjustment of different items of the wind turbine 100, for example for an adjustment of an angle of approach of the blades 5. Of course, any liquid media not having been explicitly mentioned above which are appropriate to be used in a wind turbine 100 are also intended to fall into the scope of the invention.

As an example, in the diagrams the type of liquid medium in the source 2a is different from a type of liquid medium in the source 2. Hence, advantageously, the liquid media distribution system can be operated with different liquid media in order to fulfil requirements which can only be performed with different types of liquid media. To illustrate, the liquid medium in source 2 is, for example, lubrication fluid for greasing any items. In contrast thereto, the liquid medium in source 2a is, for example, a liquid medium for defrosting of the blades 5 of the wind turbine 100.

Pipes 11, 11a, 11', 11a', 11", 11a", 11'", 11a'" are provided in the tower 1, in the nacelle 3, in the hub 4 and in the blades 5 as basic guidance elements in order to transport the liquid medium within the whole wind turbine 100 in a well-defined way. Furthermore, several additional conventional elements are provided in the context of the invention, for the sake of performing element-specific different purposes.

A first distribution sub-system 10 is arranged in the tower 1 and comprises here two pipes 11, 11a through which the liquid medium is transported from the sources 2, 2a. Furthermore, the first distribution sub-system 10 comprises optionally, and only if required, one or more further items. As an example, pumps 13, 13a are provided in order to pump the liquid medium at defined pumping-locations in the wind turbine 100. The number of the pumps 13, 13a can be chosen according to various parameters, such as a power consumption of the pumps 13, 13a, a specific weight of the liquid medium to be pumped, the pressure which is needed etc. Further, optionally, at least one heat exchanger 14 can be arranged within the tower 1 in order to heat and/or to cool the liquid medium itself, and/or to heat and/or to cool any components, for example a gearbox or a generator 80, in the wind turbine 100. As a further option, one or more valves 15 can be added to the system in order to regulate a flow of the liquid medium. Moreover, one or more reservoirs 12 can optionally be added to the system in order to store or access the liquid medium on its way through the wind turbine 100. For example, a number of the reservoirs 12 can be adjusted to a number of pumps 13, 13a in the system. As a further option, a number of reservoirs 12 and/or valves 15 can be adjusted to a number of locations in the tower 1, where access to the liquid medium is desired.

The pipes 11, 11a can be made of rigid material such as PVC, or, alternatively, of flexible hoses. Flexible hoses more easily accommodate movements of the tower 1. Rigid pipes, 11, 11a, on the other hand, could be used in a structure similar to rigid bus-bar systems, which are conventionally used for transporting electric power in the tower 1. A combination of rigid and flexible pipes 11, 11a is possible. Connection means for those two different types of pipes 11, 11a are commercially available.

The wind turbine 100 further comprises a liquid medium distributing interface between the tower 1 and the nacelle 3. This specific interface is hereinafter called tower-nacelle-interface 20, 20a. The tower-nacelle-interface 20, 20a preferably comprises one or more flexible hoses, which are arranged similar to a cable loop of electric cables 31 running from a generator 80 in the nacelle 3 into the tower 1. The electric cables 31 are used to establish a flexible connection between the tower 1 and the nacelle 3. A specific benefit of the tower-nacelle-interface 20, 20a—in addition to its ability to transfer liquid medium from the tower 1 into the nacelle 3 and vice versa—lies in the fact that a number of permissible twists of the flexible hoses of the pipe 11, 11a is matched to a number of twists for which the electric cables 31 are designed. For this purpose, an amount of sag of the flexible hoses is dimensioned in accordance to an amount of sag of the electric cables 31. A conventional twist sensor (not shown) detects a defined and permissible amount of rotations of the nacelle 3 and—when this number is reached—initiates a backwards rotation of the nacelle 3 in an opposite direction to an initial position. In this way, the electric cables 31 and the flexible hoses of the pipes 11, 11a are untwisted synchronously.

In the nacelle 3 several components, e.g. a frequency converter, a generator, a gearbox may be arranged in proximity to the liquid distribution system. In FIG. 1 only a generator 80 is shown, representative for all other usual components. Moreover, a second liquid media distribution sub-system 30 is arranged in the nacelle 3 having pipes 11', 11a' and optionally at least one of the following items: a reservoir 12', a pump 13', a heat exchanger 14' and a valve 15'. Functions of those optional items are similar as having been described above in the context of the first distribution sub-system 10 in the tower 1 and will therefore, for the sake of conciseness, not be elucidated in more detail here. The pipes 11', 11a' in the nacelle may be attached to the pipes 11, 11a in the tower via suitable connections but may also be incorporated in the pipes 11, 11a in the tower.

In addition, the nacelle 3 comprises a nacelle-hub-interface 40 as a transition element for the flow of the liquid medium from the nacelle 3 into the hub 4 and onwards. The nacelle-hub-interface 40 will be later described in more detail in the context of the description of FIG. 2. When using the first distribution sub-system 10 and the second distribution sub-system 30, as an option, a closed-loop configuration (not shown) can be set up in order to circulate the liquid media endlessly through the tower 1 and the nacelle 3. Also in this context, of course, one, several, or any of the reservoir 12, pump 13, heat exchanger 14 and valve 15 can be arranged in a desired quantity and location. In other words, arrangements and quantities of the mentioned items in FIG. 1 are understood to be merely illustrative and by no means restrictive.

The wind turbine 100 further comprises a hub 4, which is fixed to the nacelle 3, more specifically, to a rotating main shaft 41 in the nacelle 3. A third distribution sub-system 50 is arranged inside the hub 4. The third distribution-subsystem 50 comprises, in addition to a pipe 11" (only shown in FIG. 2), optionally at least a pump 13", and/or a reservoir (not shown) and/or a valve (not shown).

Via hub-blade-interfaces 70, which serve as transition elements between the third liquid distribution sub-system 50 in the hub 4 and a fourth liquid distribution sub-system 60 in the blades 5, the liquid medium is distributed into at least one of the blades 5.

The blades 5 are mounted to the hub 4. Inside at least one of the blades 5 there can preferably be arranged a fourth distribution sub-system 60. The fourth distribution sub-system 60 comprises at least a pipe 11'" and optionally, if desired, at least one of the following items: a reservoir 12'", a pump 13'", a heat exchanger (not shown), and a valve 15'". Furthermore, preferably, one or several exit openings 61 for the liquid medium can be arranged on a shell or skin of a blade 5. The exit openings 61 allow a defined exit of the liquid medium in order to be used on the exterior of the blades 5, e.g. as a defrosting medium for defrosting the blades 5 in order to optimize aerodynamical properties of the blades 5. Should the blades 5 be thickly coated with ice, such a defrosting can advantageously prevent a shutdown of the wind turbine 100 and thus contribute to an uninterrupted generation of electric power. The exit openings 61 can be realized in the form of nozzles.

Functions of the third distribution sub-system 50 and the fourth distribution sub-system 60 are similar to a function of the first distribution sub-system 10 which has already been illustrated and will thus not be described in more detail hereinafter.

FIG. 2 is an enlarged view which shows in more detail the nacelle-hub-interface 40. The nacelle-hub-interface 40 comprises a housing 43 which is similar to a housing of a main bearing and which annularly encloses a main shaft 41 of a drive train of the wind turbine 100. The housing 43 comprises a channel system 430 to allow the liquid media to transfer from pipes 11', 11a" of the second distribution sub-system 30 through first ducts 42, 42a into channels 47, 47a running axially in the main shaft 41.

To connect each of the pipes 11, 11a to its corresponding first duct 42, 42a the channel system 430 comprises two separate annular grooves 432, 434 in the inner wall of the housing 43 for each duct 42, 42a at a emersion or exit position of the respective first duct 42, 42a at which the first duct 42, 42a intersects the outer wall of the main shaft 41. The annular grooves 432, 434 are connected to the pipes 11, 11a via bores 431, 433 running radially from the grove to a junction at which the respective pipe 11, 11a may be connected. The connection between the pipes 11', 11a' and the bores 431, 433 in the housing 43 can preferably be annularly sealed by means of sealings 44. The sealings 44 can, for example, be O-rings (e.g. according to DIN 3771). As an alternative, in case that the connection between the pipe 11', 11a' and the housing 43 is made as a planed screwed flange connection (not shown), sealings 44 are dispensable.

Similar to a main bearing, the housing 43 is adequately sealed to prevent any loss or spilling of liquid media on its way into the main shaft 41. In particular, the annular grooves 432, 434 for the first ducts 42, 42a have to be regional displaced on the main shaft 41, as shown in FIG. 2 and have to be sealed against each other and against the outer surrounding, for example, by means of labyrinth seals 45. Labyrinth seals 45 as such are well known and allow a very efficient sealing between rotating and non rotating elements.

The first ducts 42, 42a are preferably arranged radially extending from an outer wall of the main shaft 41 towards the channels 47, 47a. The first ducts 42, 42a can either be arranged substantially perpendicular (first duct 42) or inclined (first duct 42a) to a longitudinal axis of the main shaft 41. Needless to say, more than two first ducts 42, 42a can be arranged in the main shaft 41. As an example of a production of the first ducts 42, 42a, the first ducts 42, 42a can be drilled into the main shaft 41.

In a preferred embodiment, the channels 47, 47a are tubes or pipes inside a hollow main shaft 41, wherein the main shaft 41 is hollow extending along a longitudinal axis of the main shaft 41 (not shown). In this case, the channels 47, 47a may be connected to the first ducts 42, 42a by appropriate junctions at the inner wall of the hollow main shaft. Of course, a diameter of such hollow main shaft 41 can advantageously be dimensioned to specific needs.

During operation of the liquid medium distribution system, the liquid medium passes through the housing 43 and enters the channels 47, 47a in the main shaft 41 via the first ducts 42, 42a. The path of the liquid flow inside the channels 47, 47a is indicated by arrows.

The main shaft 41 is fastened to the hub 4, e.g. by means of several bolts 46. Second ducts 48, 48a being arranged in a flange of the hub 4 allow a transition of the liquid medium from the channel 47, 47a into the hub 4.

As a consequence, the liquid media exit the main shaft 41 and enter further pipes 11", 11a" being arranged inside the hub 4. To this end, the pipe 11" in the hub 4 can be a separated pipes 11", 11a" are attached to the second ducts 48, 48a via appropriate junctions. Thereby, the second ducts 48, 48a are sealed at the junctions by annularly arranged seals 44. As an alternative, in case the connection between the hub (4) and the main shaft 41 is made as a planed screwed flange connection (not shown), seals 44 are not strictly necessary.

The pipes 11", 11a" in the hub 4 could also be integrally with the above mentioned tubes or pipes (building the channels 47, 47a) in the hollow main shaft 41, for example extending through the second ducts 48, 48a. In this case, a need for sealing the second duct 48, 48a with a seal 44 is eliminated.

To summarize, the invention proposes a wind turbine with a liquid medium distribution system which allows a diversified transport and usage of liquid medium in the wind turbine. Though not shown in the drawings, e.g., the transport of the liquid medium can be performed continuously with a starting and ending point in any of the sources 2, 2a. Numerous advantageous variations and modifications of the invention are possible. As an example, one kind of liquid medium distribution is performed in a kind of one-way transport (for defrosting of the blades). Further, for example, liquid oils for a use in gearboxes, bearings or hydraulic systems of the wind turbine 100 can be transported in order to perform liquid-specific tasks with components, eg. the generator 80, of the wind turbine 100. Indeed, by a simple addition of the mentioned optional elements, an easy and comfortable customization of the liquid distribution system is supported in order to meet various requirements and purposes.

Therefore, although the present invention has been disclosed in the form of preferred embodiments and variations thereon, it will be understood that numerous additional modifications and variations could be made thereto without departing from the scope of the invention. For example, the fluid transported through the distribution system may not only be transported to the hub and/or the blades but may also (partially) be used for components in the nacelle, e.g. the gearbox. For the sake of clarity, it is to be understood that the use of "a" or "an" throughout this application does not exclude a plurality, and "comprising" does not exclude other steps or elements. A "unit" or "module" or "item" or "element" or "sub-system" or "system" can comprise a number of units or modules, or items, or elements or sub-systems or systems unless otherwise stated.

The invention claimed is:
1. A wind turbine, comprising:
   a tower;
   a nacelle;
   a main shaft;
   a hub;
   a plurality of blades;
   a liquid medium distribution system for transporting liquid medium in the wind turbine, the liquid medium distribution system comprising:
   a first distribution sub-system located in the tower;
   a second distribution sub-system located in the nacelle;
   a third distribution sub-system located in the hub;

a tower-nacelle-interface connecting the first distribution sub-system to the second distribution sub-system; and a nacelle-hub-interface connecting the second distribution sub-system to the third distribution sub-system, wherein the nacelle-hub-interface comprises at least a channel in the main shaft extending substantially axial along the main shaft; and a first sub-interface connecting the second distribution sub-system to the channel.

2. The wind turbine according to claim 1, wherein the first, the second and the third distribution sub-systems each comprise a pipe and at least one of the following items:

a pump;

a reservoir;

a valve for regulating flow of the liquid medium; and a heat exchanger for heating and/or cooling the liquid medium.

3. The wind turbine according to claim 1, wherein the tower-nacelle-interface comprises a flexible hose with a sag, and wherein an amount of the sag is dimensioned in accordance to a length of at least an electric cable running from the tower into the nacelle.

4. The wind turbine according to claim 1, wherein the tower-nacelle-interface comprises a flexible hose with a sag, and wherein an amount of the sag is dimensioned in accordance to a length of at least an electric cable running from the tower into the nacelle.

5. The wind turbine according to claim 1, wherein the first sub-interface comprises at least a first duct extending radially from an outer wall of the main shaft to the channel; and a housing enclosing the main shaft annularly at a position at which the first duct intersects the outer wall of the main shaft, whereby the housing is sealed against the main shaft, and whereby the housing comprises a channel system for transferring the liquid medium from the pipe of the second distribution subsystem into the first duct.

6. The wind turbine according to claim 5, wherein the housing is sealed by a labyrinth seal.

7. The wind turbine according to claim 5, wherein the main shaft is hollow alongside its longitudinal axis, and wherein the channel comprises a pipe or a tube in the main shaft.

8. The wind turbine according to claim 5, wherein the first sub-interface comprises several first ducts and channels.

9. The wind turbine according to claim 1, wherein the nacelle-hub-interface further comprises a second sub-interface connecting the channel in the main shaft to the third distribution sub-system.

10. The wind turbine according to claim 9, wherein the second sub-interface comprises at least a second duct arranged in the hub, wherein the second duct is connected to the channel in the main shaft.

11. The wind turbine according to claim 1, further comprising:

a hub-blade-interface located in the hub and connecting the third distribution sub-system to a fourth distribution sub-system located in at least one of the blades.

12. The wind turbine according to claim 11, wherein the fourth distribution sub-system comprises a pipe, and at least one of the following items:

a pump;

a reservoir;

a valve for accessing the liquid medium; and an exit opening for the liquid medium.

13. A method of transporting liquid medium in a wind turbine, comprising:

transporting the liquid medium by a first distribution sub-system inside a tower of the wind turbine;

transporting the liquid medium into a nacelle of the wind turbine by a tower-nacelle-interface;

transporting the liquid medium inside the nacelle by a second distribution sub-system;

transporting the liquid medium into a hub of the wind turbine by a nacelle-hub-interface;

distributing the liquid medium inside the hub by a third distribution sub-system transporting the liquid medium into at least a blade of the wind turbine by a hub-blade-interface; and distributing the liquid medium inside the blade by a fourth distribution sub-system.

* * * * *